United States Patent Office.

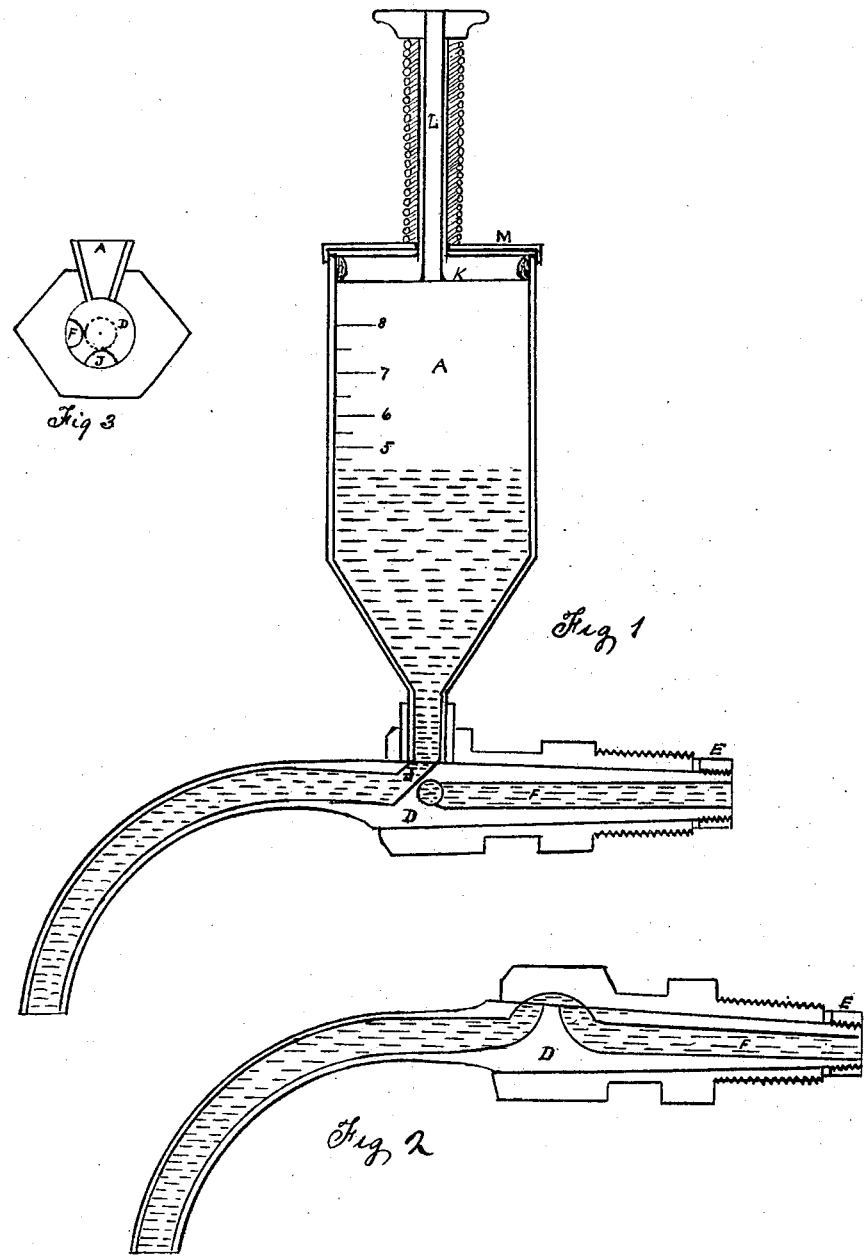

GEORGE TAYLOR, OF NEW YORK, N. Y.

Letters Patent No. 103,523, dated May 24, 1870.

IMPROVEMENT IN FAUCETS.

The Schedule referred to in these Letters Patent and making part of the same.

*To all whom it may concern:*

Be it known that I, GEORGE TAYLOR, of the city, county, and State of New York, have invented a new and improved Faucet for Liquids, the same to be used with or without a vessel or measure, for measuring the quantity of liquid required; and I do hereby declare that the following is an exact description thereof, together with the annexed drawing of the said faucet, whereby others skilled in the art of making ordinary faucets may be enabled to make the same.

My invention may be described in general terms as follows:

I make a faucet of brass or other suitable material, in which the key and nozzle are combined in one piece, the nozzle serving for the handle or lever for turning, opening, or closing of the same, the key or movable part of the faucet being inserted longitudinally or horizontally into the body or barrel of the faucet, and having its ports or openings so arranged that, when open, the nozzle shall be turned downward, as in an ordinary faucet, and, when closed, it shall be turned upward, so that it shall not continue to drip after the required quantity has been drawn off, which makes it particularly advantageous for oils, sirups, and other thick fluids, the key being secured in its place by a washer and nut, as in ordinary faucets.

The same general arrangement, with suitable ports or openings, and with suitable measure attached, may be used as a measuring faucet, its particular advantages being that, by the action of a key, the fluid may be allowed to flow from the tank, barrel, or reservoir into the measure, and, by suitable turning of the nozzle, it may be shut off from the source of supply and retained in the measure, or drawn off at the nozzle, as required, and then turned with the nozzle in an upward direction, to prevent dripping.

The measuring vessel may be made of glass or other suitable material, with suitable scale or grade attached, to be used in combination with the above-described faucet, for the purpose of measuring liquids, which, for certain purposes, may be required to assist or accelerate the flow of dense fluids.

The said measure may be made cylindrical, with a piston and a hollow piston-rod, so fitted and arranged that, by the action of the finger upon the upper end of the piston-rod, it may be used as a suction pump, to accelerate the flow of liquid into the measure, or, by the reverse action, to force it out of the measure into the receiving vessel; all of which may be better understood by reference to the accompanying drawing forming part of this specification, where similar letters represent corresponding parts.

Figure 1 is a longitudinal section of my improved faucet, as used in combination with a suitable vessel for measuring purposes. The port J is shown open, for the flow of liquid from the measure A.

E, screw-nut and washer, for securing the movable part of the faucet D in its place.

F, inlet-port, shown closed.

K, piston.

L, piston-rod.

O, spiral spring for raising the plunger.

M, cover, to fit snugly on glass measure.

Figure 2 shows a section of my improved faucet without measuring vessel, as used for ordinary purposes. The port or opening in this faucet is open when the nozzle is turned down, and closed when it is turned up.

Figure 3 shows a transverse section of my faucet at the ports or openings.

I claim—

1. A non-drip faucet, in which the nozzle and key are in one piece.

2. The combination of a non-drip faucet, together with the measuring vessel A, piston K, hollow piston-rod L, and spiral spring O.

GEORGE TAYLOR.

Witnesses:
 JAMES KIDD,
 JOSHUA KIDD.